United States Patent
Jarvis et al.

(10) Patent No.: US 9,341,719 B2
(45) Date of Patent: May 17, 2016

(54) PSUEDO MAXIMUM LIKELIHOOD TRACKING FOR GLOBAL NAVIGATION SATELLITE SYSTEMS

(75) Inventors: Murray Robert Jarvis, Stapleford (GB); James Burgess Tidd, Stockholm (SE)

(73) Assignee: QUALCOMM Technologies International, LTD., Cambridge (GB)

(*) Notice: Subject to any disclaimer, the term of this patent is extended or adjusted under 35 U.S.C. 154(b) by 853 days.

(21) Appl. No.: 13/606,647

(22) Filed: Sep. 7, 2012

(65) Prior Publication Data

US 2014/0070987 A1    Mar. 13, 2014

(51) Int. Cl.
*G01S 19/42* (2010.01)
*G01S 19/22* (2010.01)
*G01S 19/52* (2010.01)
*G01S 19/25* (2010.01)

(52) U.S. Cl.
CPC ............ *G01S 19/22* (2013.01); *G01S 19/258* (2013.01); *G01S 19/42* (2013.01); *G01S 19/52* (2013.01)

(58) Field of Classification Search
CPC ...................................................... G01S 19/42
USPC ........................................................ 342/451
See application file for complete search history.

(56) References Cited

U.S. PATENT DOCUMENTS

| | | | |
|---|---|---|---|
| 4,578,678 A | 3/1986 | Hurd | |
| 6,724,343 B2 | 4/2004 | Asher et al. | |
| 6,873,288 B2 * | 3/2005 | Heppe | G01S 3/74 342/357.48 |
| 7,164,736 B2 * | 1/2007 | Sahai et al. | 375/343 |
| 2003/0197641 A1 | 10/2003 | Stone et al. | |
| 2004/0008139 A1 * | 1/2004 | Stone et al. | 342/451 |
| 2006/0082496 A1 | 4/2006 | Winternitz et al. | |
| 2010/0271259 A1 | 10/2010 | Stafford et al. | |
| 2011/0050496 A1 | 3/2011 | Wu et al. | |

OTHER PUBLICATIONS

German Examination Report for German Appln. No. 10 2013 005 058.8 dated Oct. 31, 2013.
Petovello, "GNSS Solutions: What are vector tracking loops, and what are their benefits and drawbacks", InsideGNSS, May/Jun. 2009, pp. 16-21.
Axelrad et al., "Collective Detection and Direct Positioning Using Multiple GNSS Satellites", Navigation: Journal of the Institute of Navigation, vol. 58, No. 4, 2011, pp. 305-321.
Axelrad et al., "Enhancing GNSS Acquisition by Combining Signals From Multiple Channels and Satellites", $22^{nd}$ International Meeting of the Satellite Division of The Institute of Navigation, Sep. 22-25, 2009, pp. 2617-2628.
Closas et al., "Maximum Likelihood Estimation of Position in GNSS", IEEE Signal Processing Letters, vol. 14. No. 5, May 2007, pp. 359-362.

* cited by examiner

*Primary Examiner* — Gregory C Issing
(74) *Attorney, Agent, or Firm* — The Marbury Law Group, PLLC (57) ABSTRACT

GNSS receivers and methods of determining a current receiver state of a GNSS receiver are provided. The method includes receiving positioning signals from a plurality of satellites; generating a plurality of correlation grids from the received positioning signals, where each correlation grid is associated with a respective one of the plurality of satellites; estimating a probability distribution of the current receiver state from the plurality of correlation grids; and determining a maximum likelihood estimate of the current receiver state from the estimated probability distribution.

18 Claims, 6 Drawing Sheets

PSUEDO MAXIMUM LIKELIHOOD TRACKING FOR GLOBAL NAVIGATION SATELLITE SYSTEMS

FIELD OF THE INVENTION

The present invention is directed generally to satellite positioning systems, and, more particularly, to Global Navigation Satellite System (GNSS) receivers and methods of tracking a current position of a GNSS receiver based on an estimation of a probability distribution of the current position using correlation grids associated with a plurality of satellites.

BACKGROUND OF THE INVENTION

In a conventional GNSS, a position of a GNSS receiver may be computed based on signals received from GNSS satellites. To determine the receiver position, conventional GNSS receivers may include a tracker component and a navigator component. In general, the tracker component acquires and then tracks GNSS pseudo-ranges and GNSS pseudo-range rates from the received signals. The navigator component may convert these pseudo-ranges and pseudo-range rates into a receiver state (i.e., the receiver's position, velocity, clock and clock bias).

SUMMARY OF THE INVENTION

The present invention is embodied in GNSS receivers and methods for determining a current receiver state of a GNSS receiver. The method includes receiving positioning signals from a plurality of satellites; generating a plurality of correlation grids from the received positioning signals, where each correlation grid is associated with a respective one of the plurality of satellites; estimating a probability distribution of the current receiver state from the plurality of correlation grids; and determining a maximum likelihood estimate of the current receiver state from the estimated probability distribution.

BRIEF DESCRIPTION OF THE DRAWINGS

The invention may be understood from the following detailed description when read in connection with the accompanying drawing. It is emphasized, according to common practice, that various features of the drawing may not be to scale. On the contrary, the dimensions of the various features may be arbitrarily expanded or reduced for clarity. Moreover, in the drawing, common numerical references are used to represent like features. Included in the drawing are the following figures.

DETAILED DESCRIPTION OF THE INVENTION

As discussed above, conventional GNSS receivers may include a tracker component and a navigator component. A conventional GNSS tracker component typically uses scalar tracking loops to independently track each satellite signal. Another type of conventional GNSS receiver uses vector delay lock loops, which determine the receiver state (i.e., position, velocity, clock and clock bias) without tracking the individual satellite signals. Compared to scalar-based tracking loops, vector-based tracking loops typically have increased immunity to interference and jamming, as well as a greater immunity to receiver dynamics. Vector tracking loops, however, may have an increased processing load and complexity as compared with scalar tracking loops.

Aspects of the present invention relate to GNSS receivers and methods of determining a current receiver state of a GNSS receiver. An example method may include receiving positioning signals from a plurality of satellites and generating a plurality of correlation grids from the received positioning signals. Each correlation grid may be associated with a respective one of the plurality of satellites. The method may also include estimating a probability distribution of the current receiver state of the GNSS receiver from the plurality of correlation grids and determining a maximum likelihood estimate of the current receiver state from the probability distribution. According to an example embodiment, a history of the correlation grids of each satellite may be used to determine the maximum likelihood estimate of the current receiver state. The current receiver state may also be used to update configuration information for the correlation grids.

According to aspects of the present invention, a conventional tracking function (such as a scalar-based tracking loop) of a tracker component may be replaced with small grids of correlators, and may not require tracking of positioning signals from each satellite. Instead, an approximation to a probability density of a receiver state (including position) may be maintained in an example navigation processor of the present invention. In particular, a combined correlation function from all of the satellites may be used in order to approximate the probability density of the receiver state. A maximum of the probability density (or equivalently a maximum of the likelihood function) may be taken to be the calculated receiver state. In turn, the receiver state may be used to locate the small grids of correlators for each of the satellites within the code phase and frequency space. Thus, for a current time index, the current (combined) correlation function may be used to determine the probability density of the current receiver state.

As discussed above, conventional vector-based tracking loops determine the receiver state without tracking the individual satellite signals. However, vector-based tracking loops typically do not use all of the available information from the full correlation function. Furthermore, vector-based tracking loops do not consider modeling a probability distribution of the receiver state.

GNSS receivers and methods of the present invention may provide advantages over conventional tracking approaches. First, the GNSS receiver may use information from the full correlation function rather than only its maximum value. Second, the GNSS receiver may combine information from all of the visible satellites into a single position fix (possibly including all potentially visible satellites). Because of these above two features, GNSS receivers and methods of the present invention may outperform conventional tracking approaches in terms of accuracy.

In general, the use of combined correlation functions from all of the satellites and continuous modeling of the probability distribution for the current receiver state may improve the accuracy of tracking, as well as its resilience to multipath. The correlation history may be used to obtain accurate positions during tracking and may improve reacquisition after any occlusion of the satellite signals (for example, caused by passing through a tunnel). Furthermore, the use of small grids of correlators and a probabilistic approach to determining the receiver state may simplify the tracker architecture.

Figure 1:
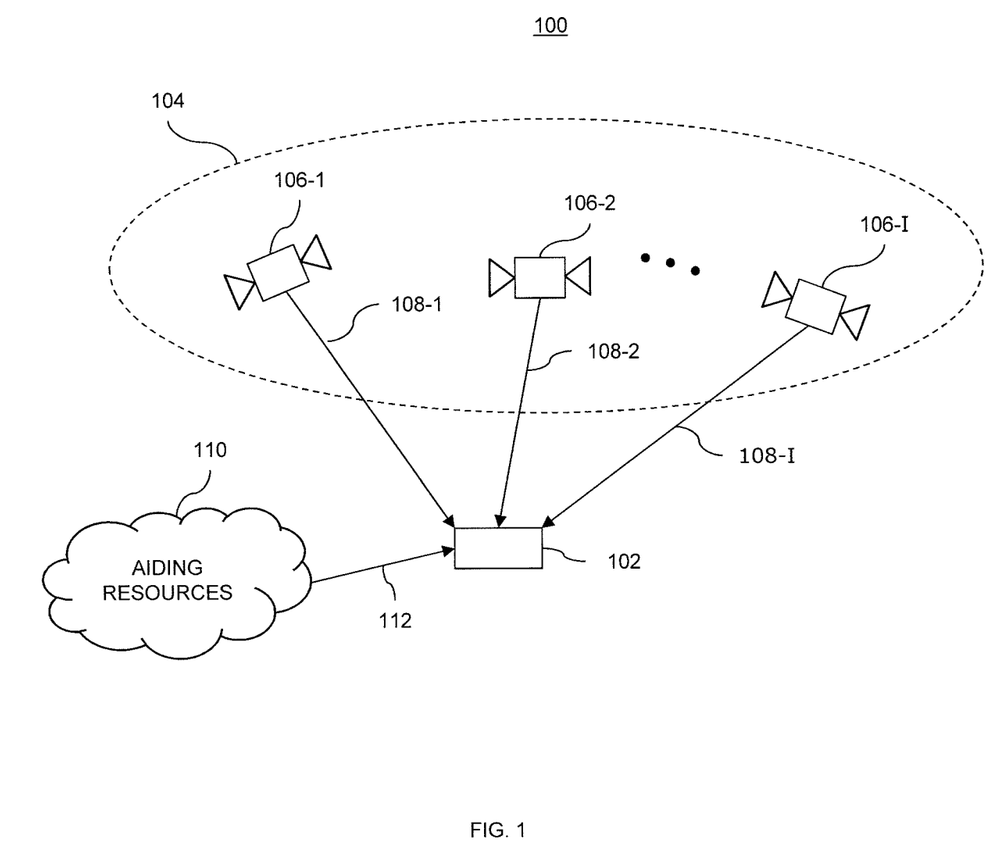
FIG. 1 is a functional block diagram of a navigation system, according to an embodiment of the present invention.

Referring to FIG. 1, a functional block diagram of an example navigation system 100 is shown. Navigation system 100 may include a constellation of satellites 104 (referred to herein as constellation 104) and receiver 102. Constellation 104 may include a number of satellites, I, (also referred to herein as satellite vehicles (SVs)), such as SV 106-1, SV 106-2, ..., SV 106-I. Although FIG. 1 illustrates at least three SVs (SV 106-1, SV 106-2 and SV 106-I), in general, the constellation 104 may include four or more SVs 106, such that I is greater than or equal to 4.

Constellation 104 may represent a GNSS such as a Global Positioning System (GPS), Galileo or Compass. Accordingly, receiver 102 may be a GNSS receiver, in that receiver 102 may be configured to receive and process positioning signals 108-1, 108-2, ..., 108-I from SV 106-1, SV 106-2, ..., SV 106-I, respectively, of a GNSS.

Each SV 106 may transmit a respective positioning signal 108 marked with a different pseudo-random noise (PRN) code, such as a Coarse/Acquisition (C/A) code and/or a Precision (P) code. Thus, SVs 106 in constellation 104 may be distinguishable from each other based on the respective PRN codes. As described further below with respect to FIG. 2, receiver 102 (also referred to herein as GNSS receiver 102) may correlate each received positioning signal 108 with a locally generated PRN code associated with the respective SV 106. Based on the correlation for each SV 106, receiver 102 may determine the current receiver state (including the current position of receiver 102).

Receiver 102 may be a standalone satellite positioning receiver or it may be integrated with another device, such as, but not limited to, a cellular telephone, a personal digital assistant (PDA), a computer, an in-car entertainment center, an AM/FM radio, a clock, or a watch.

Receiver 102 may be configured to communicate with various aiding resources 110. Aiding resources 110 may provide information 112 for assisting positioning to receiver 102 (for example, when receiver 102 is unable to receive one or more positioning signals 108 from constellation 104). Information 112 may include, for example, a coarse position (e.g., a cell tower position), a GNSS time estimate and satellite ephemeris and almanac information. Aiding resources 110 may include, without being limited to, communication devices, systems, networks or information processing services.

Figure 2:
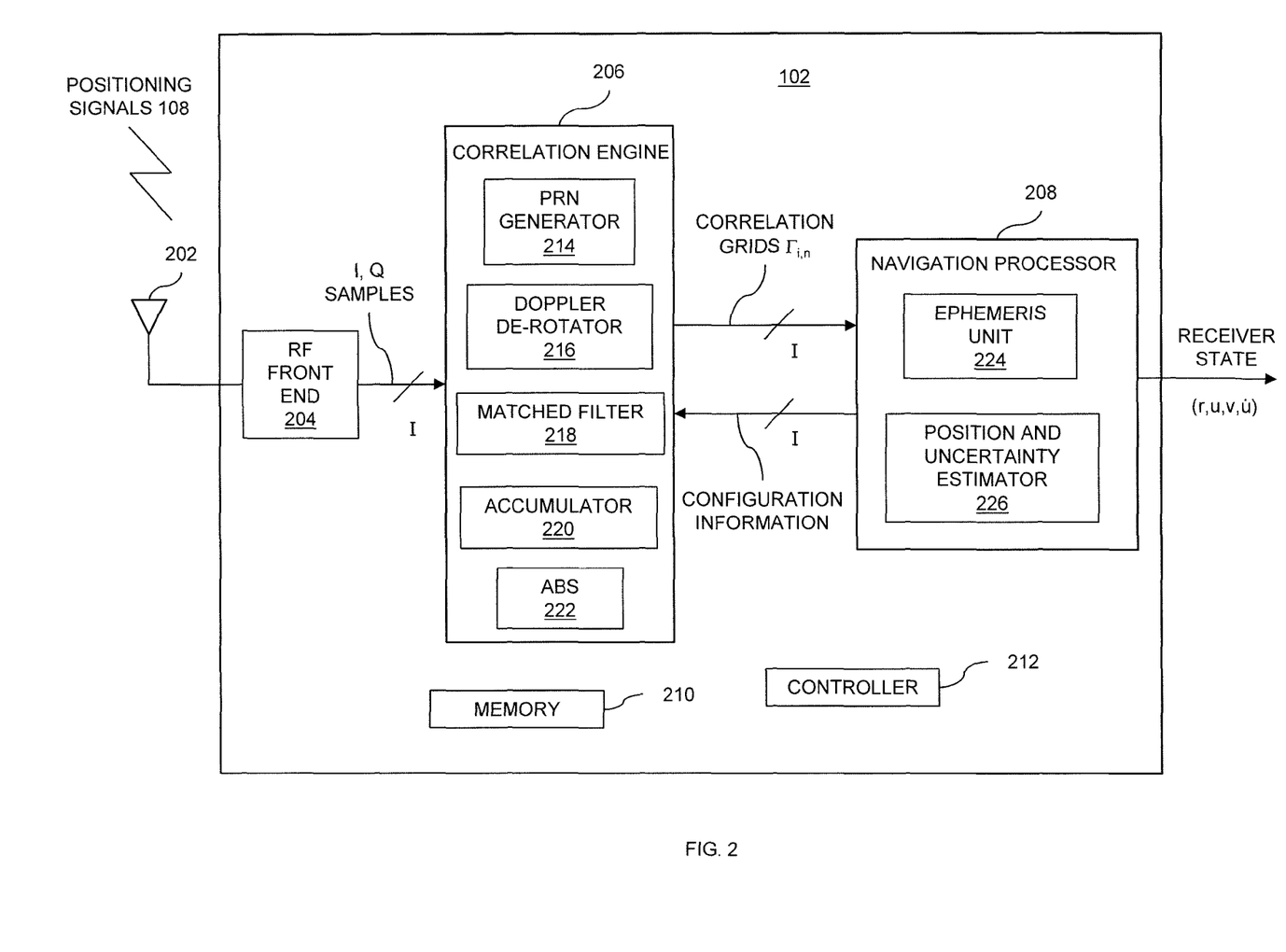
FIG. 2 is a functional block diagram of a GNSS receiver of the navigation system shown in FIG. 1, according to an embodiment of the present invention.

Referring next to FIG. 2, a functional block diagram of GNSS receiver 102 is shown. GNSS receiver 102 may include at least one antenna 202, radio frequency (RF) front end 204, correlation engine 206, navigation processor 208, memory 210 and controller 212. Memory 210 and controller 212 may be coupled to RF front end 204, correlation engine 206 and/or navigation processor 208 via a data and control bus (not shown).

Antenna 202 may receive positioning signals 108-1, 108-2, ..., 108-I (from respective SV 106-1, SV 106-2, ..., SV 106-I of constellation 104 (FIG. 1)). Each positioning signal 108 received by antenna 202 may be provided to RF front end 204 and translated to digital in-phase (I) and quadrature (Q) signals (designated in FIG. 2 as I,Q samples).

Correlation engine 206 may receive the (digital) I and Q signals, for each SV 106 (FIG. 1), and generate a respective correlation grid ($\Gamma_{i,n}$), where i is an integer from 1 to I representing a satellite index (of SVs 106) and n is an integer representing a time index. (In the description below, positioning signal 108-$i$ corresponds to the ith satellite SV 106-$i$). Correlation engine 206 may also receive configuration information for generating each correlation grid $\Gamma_{i,n}$ at a next time index (i.e., n+1). The configuration information may include grid center parameters (such as code phase and Doppler frequency) or a rate of change of the respective grid center.

Correlation engine 206 may include PRN generator 214, Doppler de-rotator 216, matched filter 218 and accumulator 220 (for coherent integration). Correlation engine 206 may also include absolute value (ABS) unit 222 used with accumulator 220 for non-coherent integration. In general, correlation engine 206 may be configured to support coherent integration (via accumulator 220) and/or non-coherent integration (via ABS unit 222 and accumulator 220).

In FIG. 2, a single channel (i.e., the ith channel) is illustrated for PRN generator 214, Doppler de-rotator 216, matched filter 218, accumulator 220 and ABS unit 222, for convenience. In practice, each of PRN generator 214, Doppler de-rotator 216, matched filter 218, accumulator 220 and ABS unit 222 may include I channels, one for each SV 106 (FIG. 1). Accordingly, the description below with respect to correlation engine 206 is identical for each received positioning signal 108-$i$.

Doppler de-rotator 216 may remove a Doppler shift from the I and Q signals (of received positioning signal 108-$i$), before any further processing is performed on these signals. The Doppler shift may be determined by navigation processor 208 and provided to correlation engine 206 as part of the configuration information.

PRN generator 214 may generate a local replica of the PRN code for corresponding SV 106-$i$ (FIG. 1). For example, the PRN generator 214 may generate a pseudorandom binary sequence such as Gold code that corresponds to a PRN code of SV 106-$i$.

Matched filter 218 receives the PRN replica (from PRN generator 214) and the Doppler compensated signals (from Doppler de-rotator 216). Matched filter 218 may perform matched filter processing of the PRN replica and Doppler compensated signals, to detect the PRN code of SV 106-$i$ (FIG. 1).

Correlation engine 206 may determine correlation energies of the matched filter output (of matched filter 218) over a code phase and Doppler frequency space. The correlation energies may be arranged into correlation grid $\Gamma_{i,n}$, so that bins of the correlation grid correspond to specific code phase and Doppler frequency locations in the code phase and Doppler frequency space.

Selection of the number of code phase bins, the number of Doppler frequency bins, a code phase bin width and a Doppler frequency bin width may be predetermined or may be adjusted for a next time index (i.e., n+1) based on the configuration information received from navigation processor 208. A grid center of the correlation grid (i.e., a center code phase value and Doppler frequency value in the correlation grid) may be adjusted for the next time index (i.e., n+1) based on the configuration information received from navigation processor 208. In an example embodiment, there may be ±8 correlation taps (i.e., code phase) spaced by ¼ chip and ±6 Doppler frequencies in the correlation grid.

Accumulator 220 may receive the matched filter output (from matched filter 218) and perform the correlation via coherent integration. The coherent integration may be performed over the code phase and Doppler frequency space. Each bin of the correlation grid may thus contain coherent correlation energy values.

According to another embodiment, ABS unit 222 may determine the correlation grid by non-coherent integration. For example, output data (i.e., coherent integrations) from accumulator 220 may be provided to ABS unit 222. ABS unit may square and sum the coherent integrations, integrating this result, to perform non-coherent integration. The non-coherent integration may be performed over the code phase and Doppler frequency space. Each bin of the correlation grid may thus contain non-coherent correlation energy values.

Navigation processor 208 may receive correlation grids $\Gamma_{i,n}$ (for each SV 106-$i$ (FIG. 1)) and may determine the current receiver state (i.e., for time index n). The current receiver state may include position (r), clock (u), velocity (v) and local clock bias (u̇). Navigation processor 208 may also provide configuration information to correlation engine 206. Navigation processor 208 may include ephemeris unit 224 and position and uncertainty estimator 226 (referred to herein as estimator 226).

Ephemeris unit 224 may provide ephemeris information to estimator 226. The ephemeris information may be used by estimator 226 to determine the configuration information provided to correlation engine 206. Ephemeris unit 224 may obtain the ephemeris information from data extracted from positioning signals 108. Ephemeris unit 224 may also obtain the ephemeris information from aiding resources 110 (FIG. 1).

Estimator 226 may receive the correlation grid $\Gamma_{i,n}$ for each SV 106-$i$ (FIG. 1) and may determine a probability distribution of the current receiver state from all of the correlation grids (for all of SVs 106 (FIG. 1)). Estimator 226 may determine a maximum likelihood estimate of the current receiver state from the probability distribution. Estimator 226 may also determine an uncertainty of the maximum likelihood estimate and generate the configuration information for correlation engine 206 based on the estimated uncertainty, the current receiver state, as well as the ephemeris information from ephemeris unit 224. Estimator 226 is described further below with respect to FIGS. 3 and 4.

Memory 210 may store one or more values from correlation engine 206 and/or navigation processor 208. For example, memory 210 may store at least one of correlation grids $\Gamma_{i,n}$, the configuration information, ephemeris information, a receiver state, an estimated probability distribution or identification information for SVs 106. Memory 210 may store the receiver state and estimated probability associated with one or more time indices (such as a current time index n and a past time index n−1). According to another embodiment, memory 210 may store PRN codes for each SV 106-$i$, thus eliminating the need for PRN generator 214. Memory 210 may include, for example, a random access memory (RAM), a magnetic disk, an optical disk, flash memory or a hard drive.

Controller 212 may control operation of one or more of RF front end 204, correlation engine 206 and navigation processor 208. Controller 212 may undertake at least a portion of the processing described above. Controller 212 may include, for example, a logic circuit, a digital signal processor or a microprocessor.

It is understood that components of one or more of RF front end 204, correlation engine 206 and navigation processor 208 may be implemented in hardware or a combination of hardware and software. Although RF front end 204, correlation engine 206, navigation processor 208, memory 210 and controller 212 are illustrated as part of one system (for example, formed on a single chip), various components of GNSS receiver 102 may be formed on separate chips.

Figure 3:
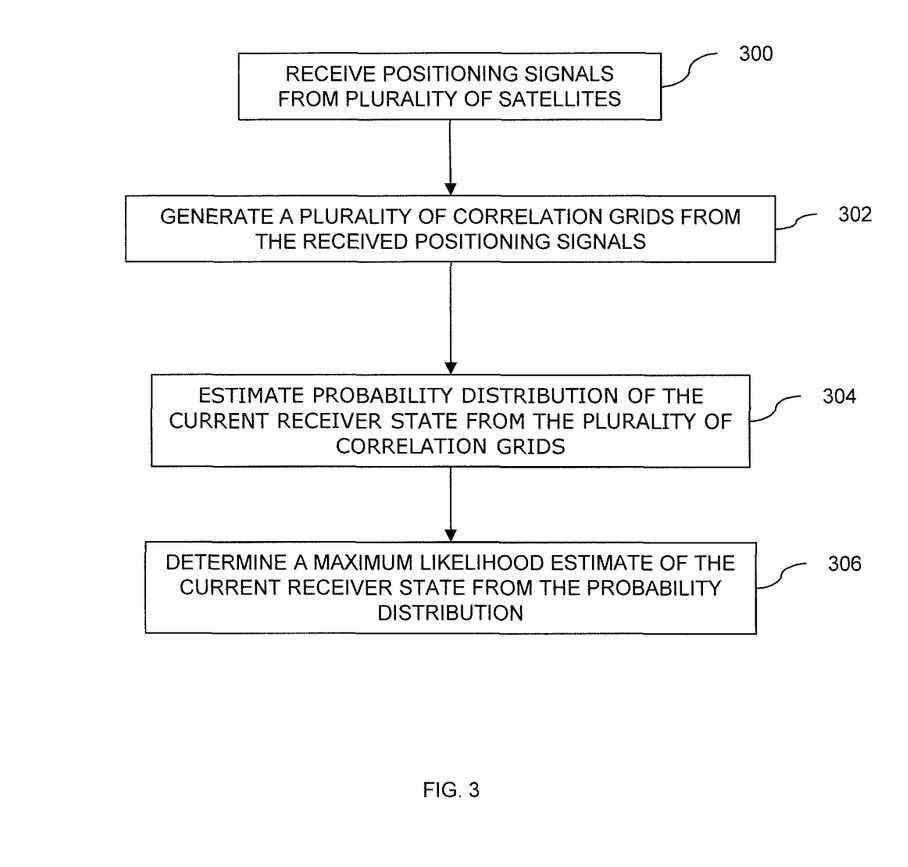
FIG. 3 is a flowchart diagram of a method for detecting a current receiver state of a GNSS receiver, according to an embodiment of the present invention.

Referring next to FIG. 3, a flowchart diagram of a method for detecting the current receiver state of GNSS receiver 102 (FIG. 2) is shown. At step 300, positioning signals are received from the plurality of satellites, for example, positioning signals 108-1, 108-2, ..., 108-I (FIG. 1) from respective SV 106-1, 106-2, ..., 106-I are received by GNSS receiver 102.

At step 302, a plurality of correlation grids are generated from the received positioning signals, such that each correlation grid is associated with a respective one of SVs 106 (FIG. 1). For example, each received positioning signal 108-$i$ (FIG. 2) is correlated, by correlation engine 206, to produce respective correlation grid $\Gamma_{i,n}$. Thus, correlation engine 206 (FIG. 2) may produce correlation grids $\Gamma_{1,n}, \ldots, \Gamma_{I,n}$ respectively associated with SV 106-1, ..., SV 106-I (FIG. 1).

At step 304, a probability distribution of a current receiver state (i.e., at time index n) is estimated from the plurality of correlation grids (determined at step 302), for example, by navigation processor 208 (FIG. 2). At step 306, a maximum likelihood estimate of the current receiver state is determined from the estimated probability distribution, for example, by navigation processor 208 (FIG. 2). As described further below with respect to FIG. 4, correlation function history may be used to update the correlation functions, as well as to determine the maximum likelihood estimate of the current receiver state.

Figure 4:
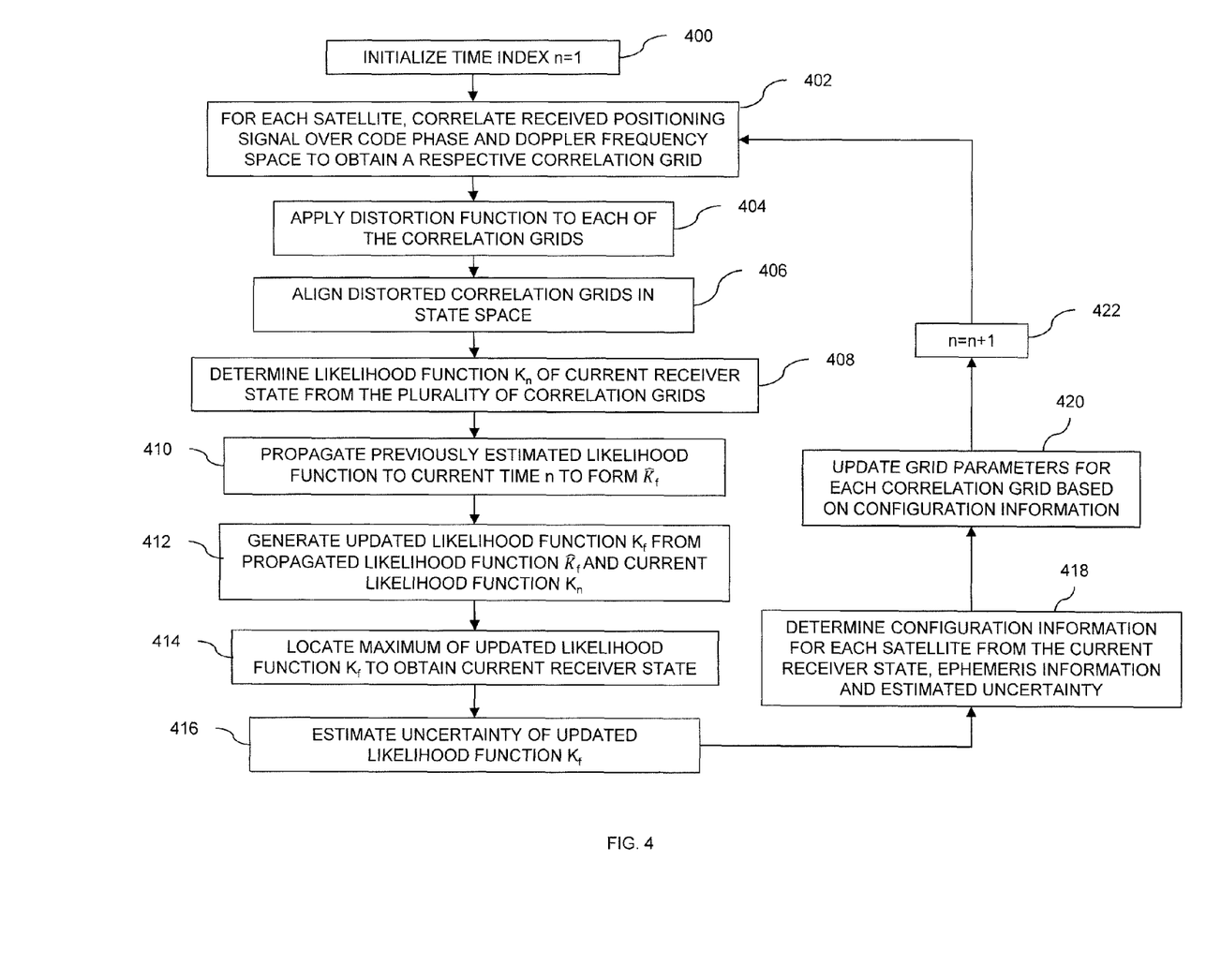
FIG. 4 is a flowchart diagram of a method for detecting a current receiver state of a GNSS receiver illustrating the use of correlation history, according to an embodiment of the present invention.

Referring next to FIG. 4, a flowchart diagram of a method for detecting the current receiver state of GNSS receiver 102 (FIG. 2) using correlation history is shown. At step 400, the time index n is initialized. At step 402, the received positioning signal 108-$i$ (FIG. 1) for each SV 106-$i$ is correlated over a code phase and Doppler frequency space to obtain a respective correlation grid $\Gamma_{i,n}$, for example by correlation engine 206 (FIG. 2). As discussed above, the correlation may be determined via coherent integration (via accumulator 220 of FIG. 2) or the correlation may be determined via non-coherent integration (via ABS unit 222 and accumulator 220 of FIG. 2).

Consider the following model for the code phase observations for SV 106-$i$ (FIG. 1) (i.e., the ith satellite):

$$\tau_i + N_i = t_{gps} + |r_i(t_{gps}) - r|/C + u + B_i + \epsilon_i \quad (1)$$

where $\tau_i$ is the observed sub-ms portion of the timing for the ith satellite (corresponding to a code phase measurement), $N_i$ is the unobserved ms portion of the timing, $t_{gps}$ is the GPS time, u is the receiver common bias (also referred to herein as the clock), $B_i$ is the known satellite clock offset, $\epsilon_i$ unknown measurement noise, $|r_i(t_{gps}) - r|$ is the distance from the ith satellite to the estimated user position and C is the speed of light in m/s. All other terms in equation (1) are expressed in seconds except the distances which are in m.

As can be seen from equation (1), given a hypothesis for r and u, together with knowledge of $t_{gps}$, $\tau_i$ be predicted. Likewise equation (2) may be used to model the observed frequency of the satellite.

$$f_i = (V_i - v) \cdot n_i - \dot{u} + \beta_i \quad (2)$$

In equation (2), $V_i$ is the satellite velocity, v is the user velocity, $n_i$ is the line of sight unit vector, u̇ is the local clock frequency offset (also referred to herein as clock bias) and $\beta_i$ is the per satellite frequency offset.

If the user velocity v and local clock frequency offset u (and indirectly the location) are known, equation (2) may be evaluated.

The above process of taking hypotheses and using them to predict where the correlation energy should appear may be repeated for each SV 106 (FIG. 1) in turn and summed to form a composite fix, K:

$$K(r, u, v, \dot{u}) = \sum_i \Gamma(\tau_i(r, u), f_i(v, \dot{u})) \quad (3)$$

where $\Gamma$ is the absolute value of the correlation bin. The position and other parameters are then chosen to be the parameters that maximize K, i.e.:

$$\{\hat{r},\hat{u},\hat{v},\dot{\hat{u}}\}\text{argmax } K(r,u,v,\dot{u}) \quad (4)$$

Instead of using a composite fix method, GNSS receiver 102 (FIG. 2) uses maximum likelihood estimation to estimate the log likelihood of the receiver state (i.e., the position, clock bias and derivatives) given the observations. The log likelihood function is given by equation (5) as:

$$\ln L(r,u,v,\dot{u}|\Gamma) = \ln p(\Gamma_0 \ldots \Gamma_i \ldots \Gamma_{N-1}|r,u,v,\dot{u}) \quad (5)$$

If it is assumed that the probability p of one correlation function is independent of the probability for another SV 106 (FIG. 1), then equation (6) is obtained:

$$\ell(r, u, v, \dot{u} | \Gamma) = \sum_i \ln p_i(\Gamma_i | r, u, v, \dot{u}) \quad (6)$$

where the log likelihood is denoted by l.

The above assumption is at best only approximately true. The observed timings from different SVs 106 (FIG. 1) may be correlated in practice. The estimates for the parameters are then given by choosing parameters to maximize equation (6), i.e.:

$$\{\hat{r},\hat{u},\hat{v},\dot{\hat{u}}\} = \text{argmax } l(r,u,v,\dot{u}|\Gamma) \quad (7)$$

It can be seen upon comparing equation (3) with equation (6) that the composite fix and maximum likelihood estimation methods may be the same if:

$$\Gamma_i = \ln p_i(\Gamma_i) \quad (8)$$

Unfortunately, equation (8) may not be accurate, but in some respects it may be reasonable. For example, equation (8) may produce a low value when far away from the true solution. Equation (8) may produce a high value when close to the true solution. A result of equation (8) may be reduced in size and broadened in the presence of scattering.

In general, equation (8) may be deficient in a number of respects. When the cross-correlation is zero (or very small), the probability of being at a position and clock bias that yields this offset may not be zero. Accordingly, a floor value may need to be added to equation (8). Furthermore, the normalization may be incorrect so that a more realistic normalization may need to be applied to equation (8). For example, if the correlation is small because the $C/N_0$ is low, it may be desirable to boost the contribution from the respective SV 106 (FIG. 1), or perhaps the contribution should remain the same or lowered further.

In addition, the triangle function of the cross correlation operation naturally blurs the response. Accordingly, data from a considerable distance away may influence data closer in proximity. Furthermore, the maximum value of the cross-correlation that is determined may not be at the most likely parameters. For example, if the line of sight is blocked and there are a number of late rays, the cross-correlation peak may be late and may not necessarily have a high value at the correct time.

Some of these problems are general problems of GNSS and others may be mitigated by applying a distortion function to the cross-correlation in order to make equation (8) as true as possible.

Accordingly, at step 404, a distortion function N may be applied to each of correlation grids $\Gamma_{i,n}$, to form $N(\Gamma_{i,n})$. In general, the distortion function may convert each correlation grid or correlation profile (the code phase dimension of the correlation grid) into an estimated probability distribution. The estimated probability distribution, thus, allows a maximum likelihood estimate of the current receiver state to be determined. The distortion function may correct for deviation of a (band-limited) correlation shape (such as a triangle function) of the correlation grid from an actual probability distribution. This deviation is a general problem for GNSS receivers and is not restricted to special cases such as multipath. It is understood that application of the distortion function is not restricted to the actual grid spacing used for evaluating the cross-correlation taps (at step 402). For example, Fourier interpolation or an approximation to the grid spacing may be applied as part of the distortion function.

The distortion function N may not be applied equally to all of the correlation grids. It is also understood that, under some circumstances, the distortion function may include a Dirac delta function. One example of a distortion function includes $N = \Sigma_i \Gamma_i$, i.e., a simple addition of the correlation profiles. Another example of a distortion function may be to apply different weights to the correlation grids depending upon the signal strength of positioning signals 108 (FIG. 1). In this manner, a lower degree of trust may be placed in positioning signals 108 having weak signal strength. The signal strength may be determined from a $C/N_0$ estimate for each positioning signal 108-*i*.

For example, correlation grid $\Gamma_{i,n}$ and a $C/N_0$ estimate for respective SV 106-*i* (FIG. 1) may be used an as input for determining the distortion function. A digital filter may be selected based on the $C/N_0$ estimate. The selected digital filter may be convolved with the respective correlation grid $\Gamma_{i,n}$. To minimize computational cost, the convolution may be restricted to the code phase dimension. The convolution may be performed, for example, in software in navigation processor 208 (FIG. 2) or accelerated by hardware.

For example, the digital filter in quarter chip spacing may be: [0 0 0 0 32 0 0 0 0] for a strong signal and [2 3 4 5 6 5 4 3 2] for a weak signal. Thus, the digital filters imply a lower degree of trust in the observed correlation profile when the positioning signal 108 (FIG. 1) is weak. According to an exemplary embodiment, the weighting profiles for each filter may not sum to a same value. In general, the distortion function may allow one correlation grid to have more influence than another correlation grid in the final solution. For example, to vary the influence of different correlation grids, weights in a weighting profile may be spread or the weight of one correlation grid may be increased in comparison with another correlation grid. According to another example, a distortion function of all zeros may be applied to completely remove all contributions from at least one of positioning signals 108.

Figure 5:
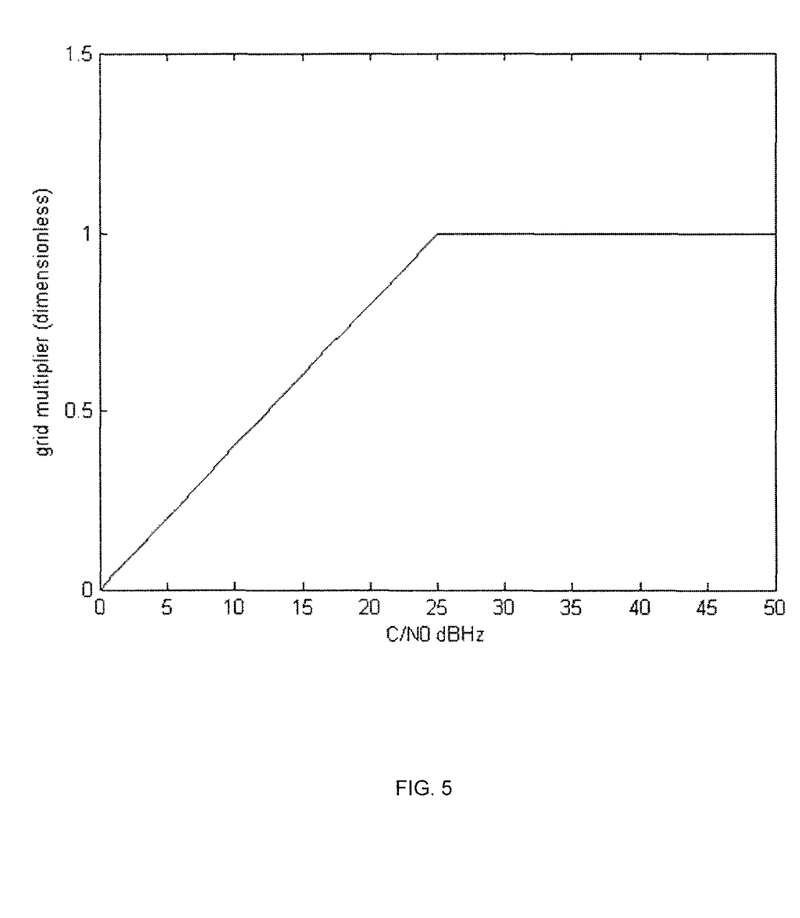
FIG. 5 is a graph of an example grid multiplier as a function of carrier-to-noise power density ratio ($C/N_0$), according to an embodiment of the present invention.

Based on the total sum of the convolved grid (i.e., by the selected digital filter) and also the $C/N_0$ estimate, each element of the convolved grid may be multiplied by a grid multiplier before being summing with the contributions from the other SVs 106 (FIG. 1) (to form N). For example, the grid multiplier may be:

$$\frac{1}{\text{total sum}} \cdot \max\left(\min\left(\frac{\text{ratio} - CN0_{weak}}{CN0_{strong} - Cn0_{weak}}, \text{weight}_{strong}\right), \text{weight}_{weak}\right)$$

where ratio represents the $C/N_0$ estimate. For example, $CN0_{weak}$ may be 0 dBHz, $CN0_{strong}$ may be 25 dBHz, $\text{weight}_{strong}$ may be 1 and $\text{weight}_{weak}$ may be 0. FIG. 5 is a graph of the grid multiplier as a function of $C/N_0$ for the above equation. As shown in FIG. 5, based on the grid multiplier, very strong signals do not excessively dominate the solution. In contrast, weak signals, where the correlation is largely noise, have a reduced weight.

Referring back to FIG. 4, at step 406, each distorted correlation grid is aligned in state space to form $\Omega_i$ (at time index n), such that:

$$\Omega_i = N(\Gamma_i) \quad (9)$$

In general, the distortion function N and the alignment $\Omega$ may be determined such that the correlation grids behave as an empirical estimate of the probability distribution at time index n.

Given the aligned grids (step 406), equation (3) may be replaced by equation (10) as:

$$K(r, u, v, \dot{u}) = \sum_i \Omega(\tau_i(r, u), f_i(v, \dot{u})) \quad (10)$$

For a suitable mapping N, the composite method, (equation (3)) may become equivalent to the maximum likelihood method (equation (10)). In practice, the maximum likelihood may only be an approximation.

One aspect that is likely to be important in practice is the tolerance of the maximum likelihood method to close-in multipath as this can be responsible for poor performance in urban environments. The behavior of close-in multipath may be different from the expected performance under conventional least squares methods.

Figure 6:
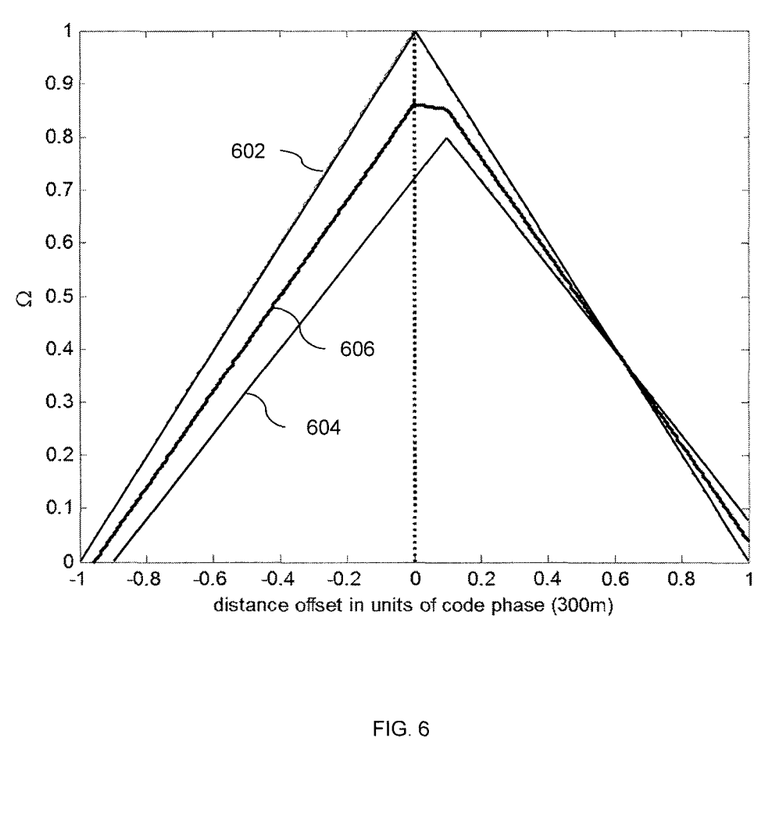
FIG. 6 is a graph of example correlation functions with respect to distance offset for individual satellite signals and a composite solution, according to an embodiment of the present invention.

For example, FIG. 6 is a graph of aligned correlation functions with respect to distance offset (in units of code phase). In FIG. 6, functions 602, 604 and 606 represent aligned correlation functions for a first satellite, a second satellite and an averaged composite solution for the two satellites, respectively. FIG. 6 shows a strong clean signal at a particular position and another, conflicting measurement at a different position for idealized triangular correlation peaks. Looking along one dimension of a resulting likelihood function (and assuming that the chosen distribution function does not distort the peak shape), the maximum may be assigned to the strong signal location and the less certain signal ignored. In practice this effect may be muted, but the ability to mitigate multipath is different from conventional least squares or Kalman approaches and is non-linear in its nature.

There are a number of possible ways in which the (correlation grid) information may be aggregated over time in GNSS receiver 102 (FIG. 2) (i.e., filtered). This could be done incrementally or the recent history could be regarded en-masse. The probability distribution may also be represented either non-parametrically (e.g., a grid) or parametrically (e.g., spline, or basis function representation). These choices may depend on the available computational power. Consideration of the recent history en-masse and a dense non-parametric grid are likely to be more accurate but may also be more computationally expensive. Regardless of the particular method it should be possible to significantly constrain the clock model and clock bias models. In some environments, such as an automotive environment, it is likely that changes in the z and ż velocity component may also be relatively limited. Effectively these constraints may significantly reduce the required search space in the parameter space.

By way of illustration the filtering is intended to estimate the maximum of the following probability function, $$P(r(t_n), u(t_n), v(t_n), \dot{u}(t_n) | \{\Omega_i(t_n)\}, \{\Omega_i(t_{n-1})\}, \\ \{\Omega_i(t_{n-2}) \ldots \})) \quad (11)$$

where { } denotes a set of correlation grids for the current SVs. Equation (11) estimates the distribution for the current parameters given the correlation history.

If equation (11) is restricted to iterative updating then the problem becomes one of estimating, $$P(r(t_n), u(t_n), v(t_n), \dot{u}(t_n) | \{\Omega_i(t_n)\}, P(r(t_{n-1}), u(t_{n-1}), \\ v(t_{n-1}), \dot{u}(t_{n-1}))) \quad (12)$$

In other words the current probability distribution is influenced only by the previous distribution and the new data.

As the latest data is not influenced by the proceeding estimation and denoting equation (12) by $P_n$:

$$P_n = P(r(t_n), u(t_n), v(t_n), \dot{u}(t_n) | \{\Omega_i(t_n)\}) \times P(r(t_{n-1}), u(t_{n-1}), \\ v(t_{n-1}), \dot{u}(t_{n-1}) | r(t_n), u(t_n), v(t_n), \dot{u}(t_n))$$

Taking the log, denoting $r(t_n)$ by $r_n$ (and other terms similarly) and denoting the filtered likelihood function by $K_f$, the above equation becomes:

$$K_f(r_n, u_n, v_n, \dot{u}_n) = \hat{K}_f(r_n, u_n, v_n, \dot{u}_n | r_{n-1}, u_{n-1}, v_{n-1}, \dot{u}_{n-1}) + \alpha K \\ (r_n, u_n, v_n, \dot{u}_n | \{\Omega_{i_n}\}) \quad (13)$$

where $\alpha$ is due to normalization. The factor $\alpha$ may be used to set the history length. For example, $\alpha$ may be decreased for low dynamics situations and increased for high dynamics situations. Equation (13) is a predictor corrector form of the filtered maximum likelihood function $K_f$. As shown in equation (13), the previous distribution is propagated to the current time as $\hat{K}_f$ and then the new data (i.e., K) is added in a weighted way.

At step 408, the likelihood function $K_n$ of the current receiver state is estimated from the plurality of correlation grids (after alignment in step 406). The likelihood function $K_n$ corresponds to the second term in equation (13).

At step 410, the previously estimated likelihood function (for time index n−1) is propagated to current time n to form $\hat{K}_f$. The propagation may be performed via a dynamic model. Typically in a dynamic model, an estimate of the current state is used to predict the next state. In equation (13), the dynamic model propagates the filtered likelihood function, based on the velocity and clock estimates. According to another embodiment, a weighting function may be applied to $\hat{K}_f$ that may slightly broaden the estimate without changing its overall weighting (to mimic the role of process noise).

At step 412, the updated likelihood function ($K_f$) is generated from the propagated likelihood function $\hat{K}_f$ and the estimated current likelihood function $K_n$ (with the appropriate normalization factor $\alpha$), to form equation (13).

At step 414, a maximum of the updated likelihood function $K_f$ is located to obtain the current receiver state. The maximum represents the maximum likelihood estimate of the current receiver state.

At step 416, an uncertainty of the updated likelihood function (step 412) is estimated. The uncertainty (equivalently confidence/covariance) in the solution may be, for example, obtained from the curvature of the (updated) likelihood function $K_f$ at the minimum. The Hessian matrix can be evaluated at the likelihood function minimum and its inverse yields the covariance matrix.

At step 418, the configuration information for each SV 106-i (FIG. 1) is determined from the current receiver state, the ephemeris information (from ephemeris unit 224 shown in FIG. 2), as well as the estimated uncertainty (step 416). The configuration information may include at least one of a grid center, a rate of change of the grid center, the number of code phase bins, the number Doppler frequency bins, a spacing of the code phase bins, a spacing of the Doppler frequency bins or a Doppler shift. The configuration information may be provided by navigation processor 208 (FIG. 2), for example, to correlation engine 206.

At step 420, grid parameters (i.e., the code phase and Doppler frequency space) for generating correlation grids for a next time index are updated for each SV 106-i (FIG. 1) based on the configuration information (step 418), for example, by correlation engine 206 (FIG. 2).

At step 422, the time index is updated and step 422 proceeds to step 402. Steps 402-422 may be repeated for each time index n.

A practical consequence of methods and GNSS receivers of the present invention is that there is no real need for tracking loops at a tracker level. Instead, best estimates of position, velocity, clock and clock bias may be continuously maintained at navigation processor 208 (FIG. 2). Navigation processor 208 (FIG. 2) may also instruct correlation engine 206 where to direct its correlation taps. The correlation in correlation engine 206 (FIG. 2) is thus a process of correlating on a small grid of correlation taps in the code phase and Doppler frequency space. The correlation grids may not need to be accurately centered by a tracking loop. Instead, the correlation grids may be accurately referenced to the start of the PRN code (while spanning the region of interest). The correlation grids may then be provided to navigation processor 208 (FIG. 2) (rather than timings) for use in updating the likelihood function.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of determining a current receiver state of a Global Navigation Satellite System (GNSS) receiver, the method comprising:
receiving positioning signals from a plurality of satellites;
generating a plurality of correlation grids from the received positioning signals, each correlation grid associated with a respective one of the plurality of satellites, and each correlation grid including a plurality of correlation values computed from a respective one of the positioning signals;
applying a distortion function to the plurality of correlation values in each of the correlation grids to produce a plurality of converted correlation values, wherein each of the correlation grids is modified according to a signal strength of the respective received positioning signals;
estimating a probability distribution of the current receiver state from the plurality of converted correlation values; and
determining a maximum likelihood estimate of the current receiver state from the estimated probability distribution.

2. The method of claim 1, wherein the current receiver state includes at least one of a position, a velocity, a clock or a clock bias.

3. The method of claim 1, wherein the generating of the plurality of correlation grids includes, for each correlation grid:
correlating a respective one of the positioning signals according to a corresponding code phase and Doppler frequency space.

4. The method of claim 3, wherein the correlating of the respective one of the positioning signals includes at least one of coherent integration or non-coherent integration.

5. The method of claim 1, the method further comprising:
estimating an uncertainty of the maximum likelihood estimate of the current receiver state.

6. The method of claim 5, the method further comprising:
determining configuration information for each correlation grid based on at least one of the current receiver state, ephemeris information or the estimated uncertainty, the configuration information being used to update each correlation grid for a next receiver state.

7. The method of claim 6, wherein the configuration information, for each correlation grid, includes at least one of: a correlation grid center, a rate of change of the correlation grid center, a number of code phase bins, a number of Doppler frequency bins, a spacing of the code phase bins, a spacing of the Doppler frequency bins and a Doppler shift.

8. The method of claim 1, wherein the determining of the maximum likelihood estimate of the current receiver state includes:
determining a likelihood function from the estimated probability distribution of the current receiver state;
propagating a previously estimated likelihood function of a past receiver state to the current receiver state; and
combining the propagated likelihood function and the determined likelihood function to form an updated estimated likelihood function for the current receiver state, the current receiver state being determined from a maximum of the updated estimated likelihood function.

9. The method of claim 8, wherein the combining of the propagated likelihood function and the determined likelihood function includes applying a normalization factor to the determined likelihood function.

10. The method of claim 1, wherein prior to estimating the probability distribution, the method comprising:
aligning the plurality of correlation grids in a state space.

11. A Global Navigation Satellite System (GNSS) receiver comprising:
a memory for storing a correlation history of the GNSS receiver; and
a navigation processor configured to:
receive a plurality of correlation grids, each correlation grid associated with a respective one of a plurality of satellites, and each correlation grid including a plurality of correlation values computed from a GNSS signal of the respective one of a plurality of satellites;
applying a distortion function to the plurality of correlation values in each of the correlation grids to produce a plurality of converted correlation values, wherein each of the correlation grids is modified according to a signal strength of the respective received positioning signals;
estimate a probability distribution of a current receiver state of the GNSS receiver from the plurality of converted correlation values, and determine a maximum likelihood estimate of the current receiver state based on the estimated probability distribution and the correlation history.

12. The receiver of claim 11, wherein the navigation processor updates the correlation history based on the maximum likelihood estimate of the current receiver state.

13. The receiver of claim 11, wherein the correlation history includes a previously estimated likelihood function of a past receiver state, and the navigation processor is configured to:
  determine a likelihood function from the estimated probability distribution of the current receiver state;
  propagate the previously estimated likelihood function of the past receiver state to the current receiver state; and
  combine the propagated likelihood function and the determined likelihood function to form an updated estimated likelihood function for the current receiver state, the navigation processor determining the current receiver state from a maximum of the updated estimated likelihood function.

14. The receiver of claim 11, further comprising a correlation engine configured to receive positioning signals from the plurality of satellites and generate the plurality of correlation grids from the received positioning signals.

15. A Global Navigation Satellite System (GNSS) receiver comprising:
  a correlation engine configured to:
    receive positioning signals from a plurality of satellites and generate a plurality of correlation grids from the received positioning signals, each correlation grid being associated with a respective one of the plurality of satellites, and each correlation grid including a plurality of correlation values from a respective one of the positioning signals; and
    apply a distortion function to the plurality of correlation values in each of the correlation grids to produce a plurality of converted correlation values, wherein each of the correlation grids is modified according to a signal strength of the respective received positioning signals; and
  a navigation processor configured to
    estimate a probability distribution of a current receiver state from the plurality of converted correlation values; and
    determine a maximum likelihood estimate of the current receiver state from the estimated probability distribution.

16. The receiver of claim 15, wherein the correlation engine, for each correlation grid, correlates a respective one of the positioning signals according to a corresponding code phase and Doppler frequency space.

17. The receiver of claim 15, wherein the navigation processor estimates an uncertainty of the maximum likelihood estimate of the current receiver state.

18. The receiver of claim 17, wherein the navigation processor determines configuration information for each correlation grid based on at least one of the current receiver state, ephemeris information or the estimated uncertainty, the configuration information being provided to the correlation engine to update each correlation grid for a next receiver state.

* * * * *